(12) United States Patent
Moake (10) Patent No.: US 9,500,753 B2
(45) Date of Patent: Nov. 22, 2016

(54) GAMMA RAY DETECTORS WITH GAIN STABILIZATION

(71) Applicant: Halliburton Energy Services, Inc., Houston, TX (US)

(72) Inventor: Gordon Layne Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/787,749

(22) PCT Filed: Nov. 6, 2013

(86) PCT No.: PCT/US2013/068770
§ 371 (c)(1),
(2) Date: Oct. 28, 2015

(87) PCT Pub. No.: WO2015/069240
PCT Pub. Date: May 14, 2015

(65) Prior Publication Data
US 2016/0077224 A1    Mar. 17, 2016

(51) Int. Cl.
*G01V 5/00* (2006.01)
*G01T 1/40* (2006.01)
*G01V 5/06* (2006.01)

(52) U.S. Cl.
CPC .. *G01T 1/40* (2013.01); *G01V 5/06* (2013.01)

(58) Field of Classification Search
CPC ................................ G01V 5/06; G01V 5/101
See application file for complete search history.

(56) References Cited

U.S. PATENT DOCUMENTS

| | | |
|---|---|---|
| 3,767,921 A | 10/1973 | Jones |
| 4,126,406 A | 11/1978 | Traylor et al. |
| 4,450,354 A | 5/1984 | Smith, Jr. et al. |
| 4,585,939 A | 4/1986 | Arnold et al. |
| 4,717,825 A | 1/1988 | Smith, Jr. et al. |
| 4,857,729 A | 8/1989 | Gadeken et al. |
| 5,023,449 A | 6/1991 | Holenka et al. |
| 5,272,336 A | 12/1993 | Moake |
| 5,360,975 A | 11/1994 | Stoller |
| 5,459,314 A | 10/1995 | Plasek |
| 5,489,779 A | 2/1996 | Pemper et al. |
| 5,600,135 A | 2/1997 | Jacobson |
| 6,051,830 A | 4/2000 | Moake |
| 7,081,616 B2 | 7/2006 | Grau et al. |

(Continued)

FOREIGN PATENT DOCUMENTS

WO        02082124        10/2002

OTHER PUBLICATIONS

International Search Report and Written Opinion of PCT Application No. PCT/US2013/068770 dated Aug. 6, 2014, pp. 1-14.

*Primary Examiner* — Kiho Kim
(74) *Attorney, Agent, or Firm* — Chamberlain Hrdlicka (57) ABSTRACT

Systems and methods for measuring natural gamma rays in a wellbore are disclosed that involve using a downhole gamma ray detector that provides signals that scale with energy deposited by gamma rays in the downhole gamma ray detector and storing digital signals in channels. A derivative of the digital signals is taken and the location of the maximum value of the derivative is used to stabilize the gamma ray detector by adjusting the threshold or gain based on the maximum value of the derivative or adjusting an amplifier or variable high voltage source. Other systems and methods are presented.

20 Claims, 6 Drawing Sheets

(56) References Cited

U.S. PATENT DOCUMENTS

| | | |
|---|---|---|
| 7,202,456 B2 | 4/2007 | Mickael |
| 7,253,401 B2 | 8/2007 | Mickael et al. |
| 7,361,886 B2 | 4/2008 | Stoller et al. |
| 7,482,578 B2 | 1/2009 | Randall |
| 7,482,579 B2 | 1/2009 | Gilchrist, Jr. |
| 7,800,052 B2 | 9/2010 | Gadot |
| 8,173,953 B2 | 5/2012 | Stoller et al. |
| 2007/0063143 A1 | 3/2007 | Blackwood et al. |
| 2011/0186721 A1* | 8/2011 | Galford .............. G01V 5/101 250/252.1 |
| 2013/0134304 A1 | 5/2013 | Beekman et al. |

* cited by examiner

GAMMA RAY DETECTORS WITH GAIN STABILIZATION

FIELD

The present disclosure relates generally to oilfield measurements, and more particularly, but not by way of limitation, to downhole gamma ray detectors with gain stabilization.

BACKGROUND

In exploring for and producing hydrocarbons from a subterranean formation, the measure of naturally occurring gamma radiation may be helpful. Natural gamma radiation is emitted by certain subsurface materials, such as, thorium (Th), uranium (U), and potassium (K). The radioisotopes or their equivalents of such substances are detected or measured. Typically natural gamma radiation detectors (or gamma ray detectors) are divided into two classes: gross counting and spectral. Spectral tools measure the gamma radiation over a spectrum and the gross counting tools focus on the total number of counts detected above a threshold.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the embodiments described herein, the description may omit certain information known to those skilled in the art. The following detailed description is not to be taken in a limiting sense, and the scope of the illustrative embodiments is defined only by the appended claims.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Unless otherwise indicated, as used throughout this document, "or" does not require mutual exclusivity.

Figure 1:
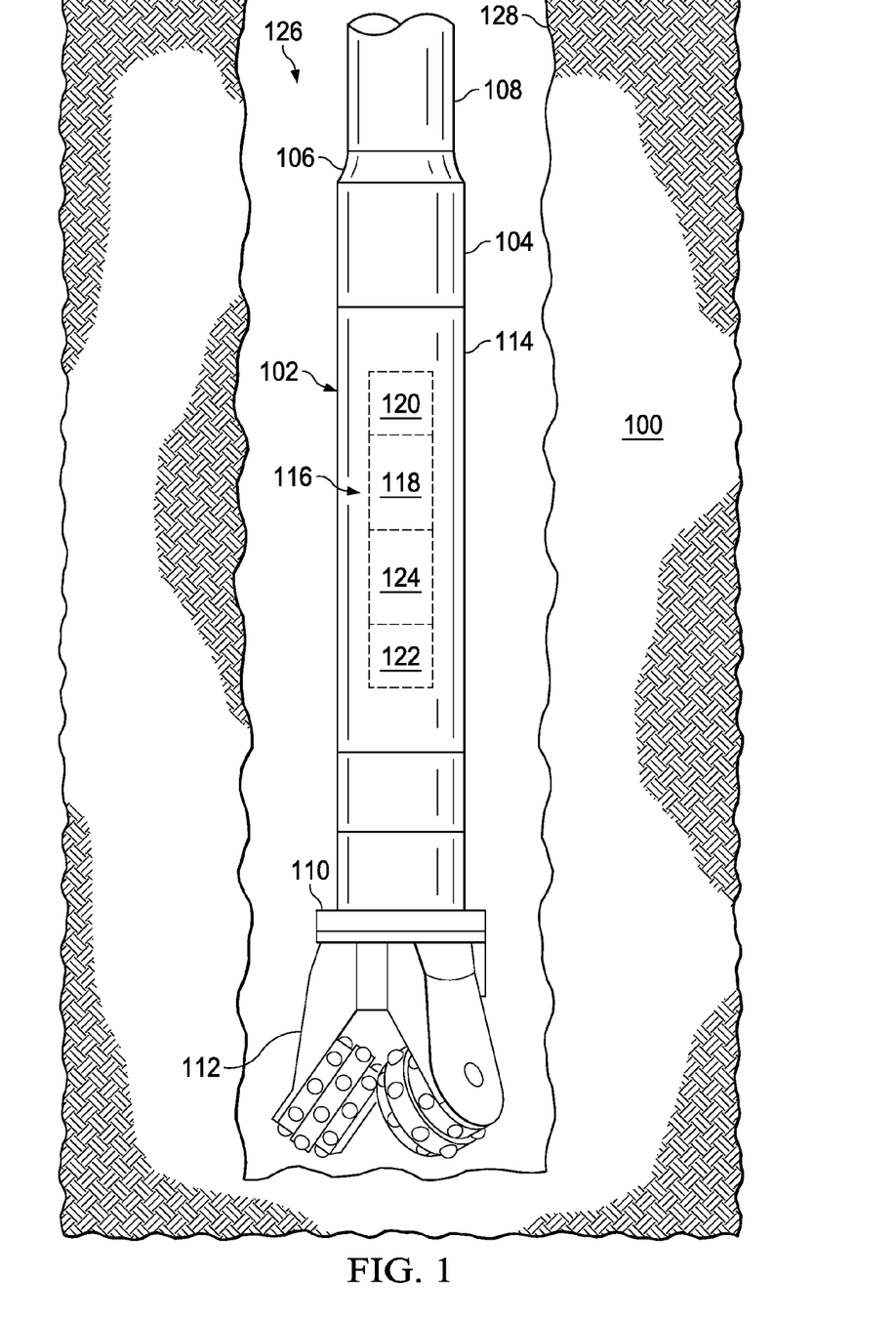
FIG. 1 is a schematic cross section of a portion of a formation showing a logging-while-drilling assembly disposed therein that includes a system for measuring natural gamma rays in a wellbore.

Referring now to the drawings, FIG. 1 is a schematic cross section of a portion of a formation 100 showing a logging-while-drilling assembly 102, borehole assembly, or tool. The logging-while-drilling assembly or tool 102 includes a drill collar 104 that is coupled to the distal end 106 of a drill string 108. A lower end 110 of the drill collar includes a drill bit 112. The drill collar 104 may include one or more logging-while-drilling (LWD) tools 114, e.g., a gamma ray detector system 116.

The gamma ray detector system 116 includes a downhole gamma ray detector 118 and may include a battery or power source 120 and a telemetry unit 122. The order and arrangement could, of course, vary. The gamma ray detector system 116 may communicate the count from the subterranean location to the surface using the telemetry unit 122, e.g., mud pulse telemetry, communication cable, or other means. The gamma ray detector system 116 also includes a processing unit 124. The processing unit 124 includes one or more memories and one or more microprocessors operable to execute code to perform various functions or may use electronics to carryout various functions.

The logging-while-drilling assembly 100 is shown within a borehole or wellbore 126 having bore walls 128. The drill string 108 is coupled to a drilling rig (not shown) that is on the surface of the earth that rotates the drill string 108.

Figure 2:
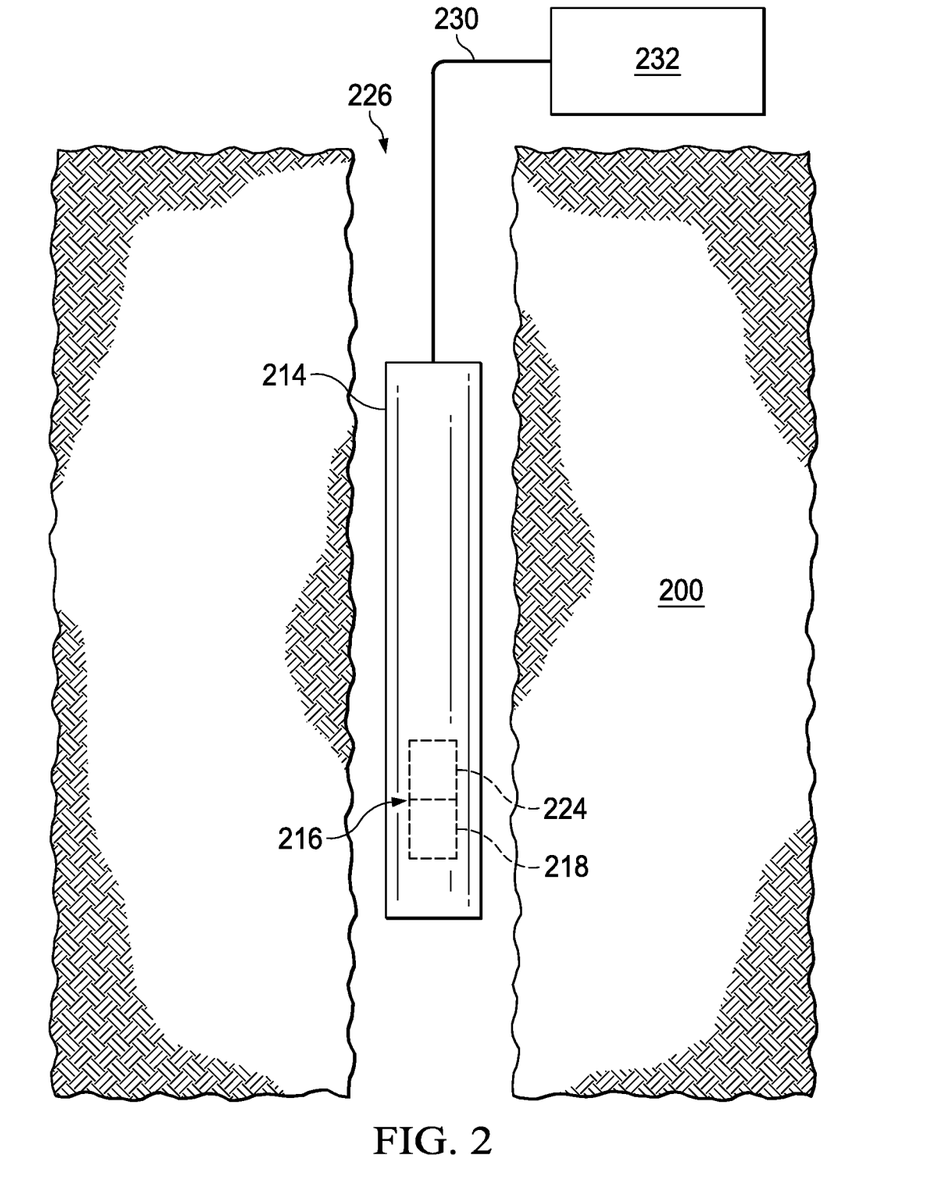
FIG. 2 is a schematic cross section of a formation showing a logging tool that includes a system for measuring natural gamma rays in a wellbore.

FIG. 2 shows a schematic cross section of a formation 200 with a wireline logging tool 214 that houses a gamma ray detector system 216 disposed therein. As before, the gamma ray detector system 216 includes a processing unit 224 and a downhole gamma ray detector 218. The logging tool 214 is shown in a wellbore or borehole 226. The logging tool 214 is lowered into wellbore 126 by means of a wireline cable 230. The wireline cable 230 may be used both to support the logging tool 214 and provide a power, control signal or data transmission path to a surface unit 232.

Figure 3:
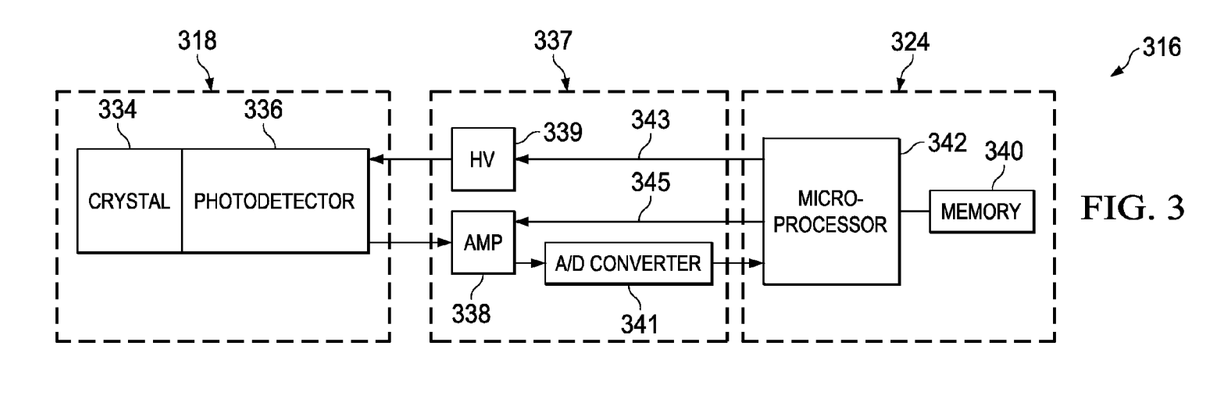
FIG. 3 is schematic diagram showing an illustrative embodiment of a gamma ray detector system.

Referring now primarily to FIG. 3, a schematic diagram is presented showing an illustrative embodiment of a gamma ray detector system 316. The gamma ray detector system 316 includes a downhole gamma ray detector 318, electronics unit 337, and a processing unit 324. The gamma ray detector 318 may be part of a drilling assembly, for logging while drilling, or measuring while drilling operations (see FIG. 1), or may be a wireline tool for logging an existing well (see FIG. 2). The gamma ray detector system 316 may include a plurality of azimuthal gamma ray detectors, e.g., 2, 3, 4, 5, 6, or more. Each gamma ray detector 318 counts gamma ray energy emitted naturally subsurface, but could also be used for other sources of gamma rays in the wellbore. The azimuthal gamma ray detectors may be near an exterior of the logging tool and be spaced about a circumference. While a plurality of gamma ray detectors may be included, only one is explicitly presented here.

The one or more gamma ray detectors provide signals that scale the energy deposited by the gamma rays. The gamma ray detector 318 includes one or more scintillator crystals 334 for receiving the gamma rays that then create light emissions that influence an adjacent, optically-coupled photodetector 336, e.g., a photomultiplier tube. The gamma ray detector 318 is electrically coupled to an electronics unit 337. The electronics unit 337 may include an amplifier 338, a variable high voltage supply unit 339, and an analog-to-digital (A/D) converter 341. The high voltage supply unit 339 is coupled to and powers one or more of the gamma ray detectors 318. One power supply 339 may be used to power multiple gamma ray detectors. The high voltage supply 339 or supplies may be configured so that their output voltage can be adjusted by an external controller or processor 342 as suggested by 343.

The electronics unit 337 also includes the one or more amplifiers 338 to modify the amplitude of the signals coming from the one or more gamma ray detectors 318. The amplifier 338 may be configured to be adjusted by an external controller as suggested by 345. Finally, the electronics unit 337 includes the analog-to-digital (A/D) converter 341 to convert voltage signals to digital signals that may be passed to the processing unit 324. The electronics unit 337 is for converting and processing (e.g., adjusting the signal amplitude or adjusting the voltage supplied to the gamma ray detector) the signals including preparing digital signals.

The processing unit 324 includes one or more memories 340 associated with one or more processors, e.g., microprocessor 342. As is well understood, the one or more memories 340 together with the one or more processors 342 are operable to execute code or otherwise accomplish various functions as desired. The processor 342 may be configured to control the output voltage of the one or more variable high-voltage supplies 339 or the one or more amplifiers 338. A number of non-limiting examples will be presented further below.

In the present application, the gamma ray detector system is a gross counting gamma ray detector, but the process of determining the gross count involves developing counts over a plurality of channels arranged in a spectrum. Whether accomplished in logging while drilling (FIG. 1) or on a wireline (FIG. 2), the gamma ray detector system is operable to develop count data over n-channels. Each channel represents a range of energy levels, e.g., three thousand electron volts (3 keV). The number of channels may vary for different applications; for example, n may be 10, 16, 20, 50, 64, 100, 128, 150, 200, 256, 400 or more, or any number in between. The counts stored in the channels forms a gamma spectrum.

In one illustrative embodiment, the energy spectrum received from the emitted gamma radiation is recorded across a spectrum of n channels and the total count above a threshold is determined. The threshold is set above the noise and yet low enough to measure substantially all of the gamma rays that enter the gamma ray detector. The threshold may, at least initially, be a predetermined value.

The gain of the gamma ray detector varies at times with certain variables, e.g., temperature, equipment limitations, high voltage of the photomultiplier in the detector, etc. These variations will affect the counts stored in the various channels. To obtain a gross count that is not affected by these variations, the system gain of each gamma ray detector typically needs to be independently stabilized. This stabilization may be accomplished in a number of ways in different embodiments using the location of a maximum derivative of the signals: the hardware gain may be adjusted, the spectra may be adjusted (expanded or compressed), or the threshold may be adjusted. The methods presented herein do not rely on gamma-ray sources housed in the tool. The approaches use the location of the derivative as a reference from which adjustments are determined.

In the first approach to stabilization, the hardware gain is adjusted. The hardware may be adjusted by (1) adjusting the output of the high voltage supply 339, (2) adjusting the gain of the amplifier 338, or (3) adjusting both the high voltage output 339 and the amplifier 338 gain. The third (3) way is useful when hardware control of individual detector gains is not possible. In this way, a stabilized gross count may be obtained by summing the same channels. Spectra are accumulated for a period of time and then analyzed to determine the amount of adjustment. The processing unit 324 then sends a control signal to the high voltage supply 339 or amplifier 338 to make the required adjustment. The time between adjustments should be sufficiently long so that a statistically significant adjustment can be made, yet short enough so that the gamma ray detector 318 can respond to true gain variations. The intervals may vary as the magnitudes of the counts stored in the spectra vary. When the hardware gain is adjusted, a stable gross count is obtained by summing the same channels above a fixed threshold.

In the second approach, stabilization is achieved by adjusting the spectra mathematically to change the gain of the spectrum. The spectra are either expanded or compressed so that the threshold corresponds to the desired channel number. With this method, a stable gross count is obtained by summing the same channels in the stabilized spectra, above a fixed threshold.

In the third approach, stabilization is achieved by adjusting the threshold used and requires that the threshold for a stable gross count be determined. The gain relative to the nominal gain is computed and the threshold is changed based on that. That is, you change the threshold to the desired location rather than changing the gain to shift the spectra. The gross count is then obtained by summing all the channels above that threshold. Interpolation may be used when the desired threshold is at a fraction of a channel.

Figure 4:
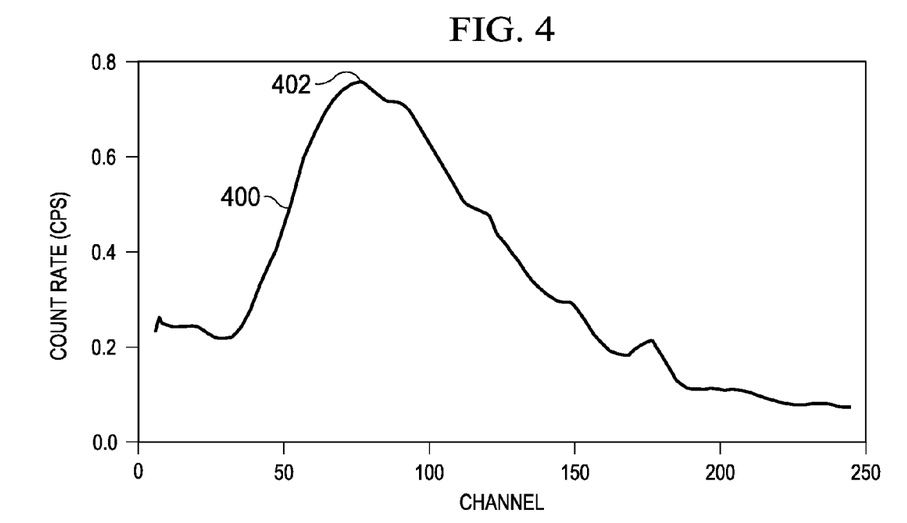
FIG. 4 is a schematic plot of illustrative, hypothetical gamma ray data with count rate in counts per second (cps) on the ordinate axis and energy levels (weakest to strongest) over the channels on the abscissa axis, shown without noise.
Figure 5:
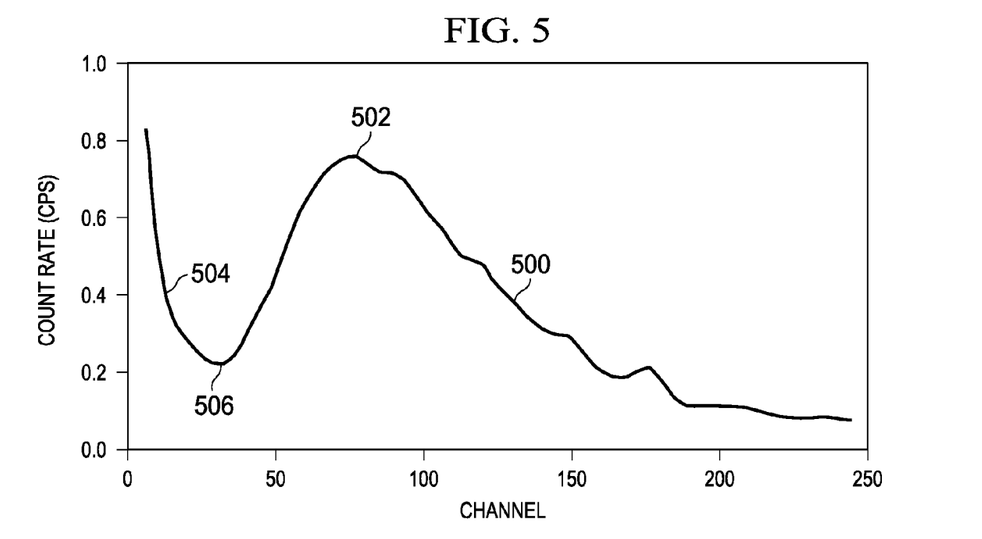
FIG. 5 is a schematic plot of illustrative, hypothetical data that is the same as FIG. 4 but with noise shown.

Referring now primarily to FIG. 4, which is a schematic plot of illustrative, hypothetical data for illustrative purposes, the ordinate presents a count rate in counts per second (cps) and the abscissa presents approximately 250 channels going from lowest energy to highest energy level. The curve 400 representing the data in FIG. 4 is shown without noise for illustration purposes. The maximum is shown at 402. FIG. 5 is a schematic plot of hypothetical data that is essentially the same as FIG. 4 but with the noise shown. The curve 500 is shown with a maximum 502, or gamma peak, and a noise portion 504, or segment. The desired threshold is set above the maximum expected noise level, yet low enough so that as many gamma rays as possible will be detected. Assuming that spectrum 500 is obtained at the desired nominal system gain and that the noise 504 is the maximum expected, then a reasonable choice for the threshold 506 is at channel 28.

According to one illustrative embodiment, an identifiable, stable point of the curve 500 is desired for use as a reference for adjusting the gain, threshold, or hardware. In this embodiment, a maximum value of the derivative of the curve 500 with respect to channel number is used. The maximum of the derivative curve, which is located on the rising edge of the peak of the raw data set, is easy to identify and may be less susceptible to variations in density of the formation. The derivative of the spectrum data will typically occur about half way up the low-channel side of the peak. The desired threshold is referenced to the location of the maximum of the derivative. For example, the threshold may be set at half the channel number of the maximum. Thus, in one illustrative embodiment, the threshold is held fixed and the system gain is varied to keep the threshold location fixed at substantially a constant energy equivalent. Thus, the gross count, which is the sum of all the channels above the threshold, is the sum of the same channels. That is, in this embodiment, the system seeks to keep the location of the maximum value at the same channel number. In another embodiment, the gain is allowed to vary and the threshold is varied so as to keep the threshold's location relative to the location of the maximum of the derivative constant. In this case, the channels that are summed to obtain the gross count vary, and an interpolation scheme may be used when the threshold is a fraction of a channel.

Figure 6:
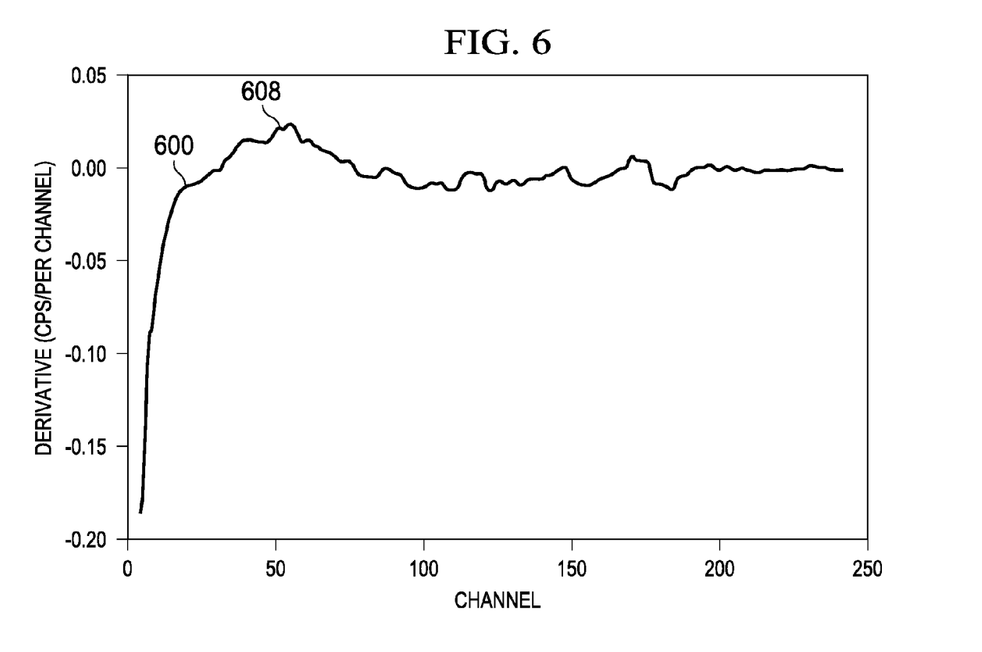
FIG. 6 is a schematic plot of the derivative of the curve of FIG. 5 according to one illustrative embodiment.

The derivative at channel location i may be calculated or determined using a number of techniques such as taking the difference between the counts in channels adjacent to channel i. It may also be determined by subtracting a sum of channels below channel i from a sum of channels above channel i. Other ways of calculating the derivative may be used and higher order derivatives may be used in some embodiments. FIG. 6 presents a curve 600 of the derivative of the curve 500 of FIG. 5. The maximum value 608 of the first derivative curve 600 is shown to be approximately 50. Assuming that curve 500 was obtained at the desired nominal gain level, channel 50 may be used as a reference point for adjusting the curves of subsequent data sets collected at various times or continuously.

Figure 7:
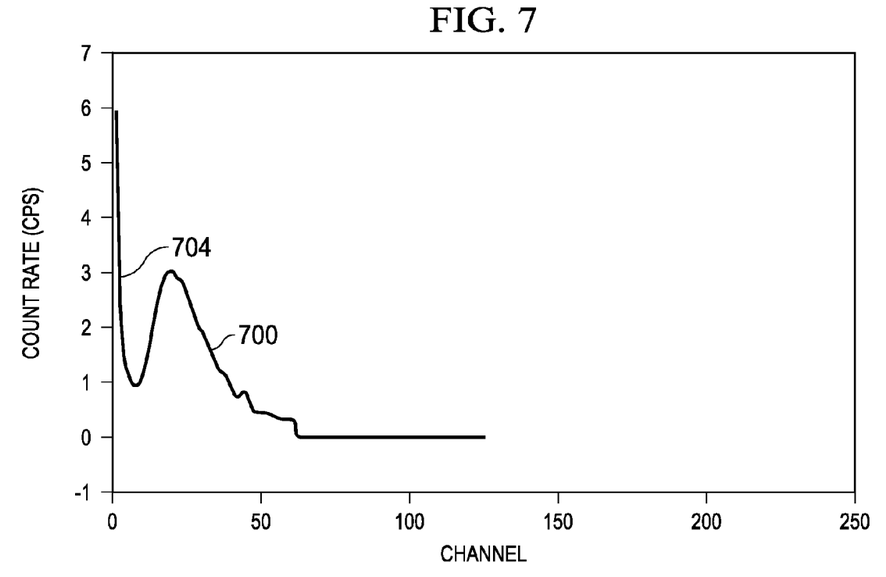
FIG. 7 is a schematic plot of illustrative, hypothetical gamma ray data with count rate in counts per second (cps) on the ordinate axis and energy levels (weakest to strongest) over the channels on the abscissa axis for a second data set.
Figure 8:
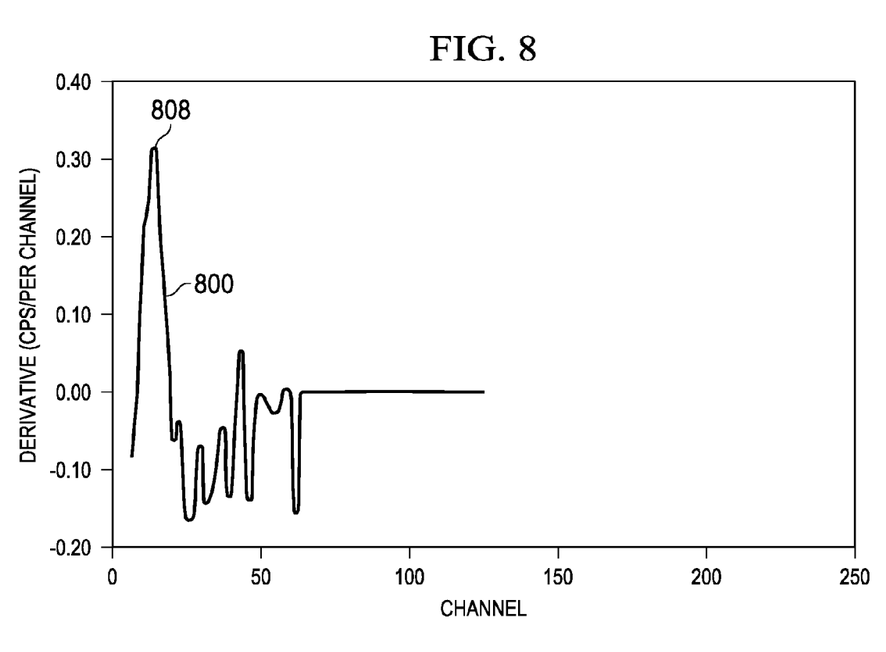
FIG. 8 is a schematic plot of the derivative of the curve of FIG. 7 according to one illustrative embodiment.

For example, consider a second data set shown in FIG. 7, which is a schematic plot of hypothetical data for illustrative purposes. This data set represents the formation as curve 500 in FIG. 5 did, but the system gain has been set four times lower. The curve 700 is shown with noise 704. As before the derivative of the data curve 700 is taken as shown in FIG. 8. The derivative curve 800 has a maximum value 808 that is located at approximately channel 12. A gain adjustment factor may then be calculated by determining a factor that will cause the location of the maximum value 808 to move to the desired location, which is channel 50 in this case. So in this example, the algebraic expression would be 12x=50 and x=4.17. Thus, the gain adjustment factor is 4.17. Although an ideal gain adjustment would be 4.00, this is an improvement. In one embodiment, the gain threshold is computed relative to channel 12 and all channels above the threshold are summed to obtain the gross count. In another embodiment the spectrum is mathematically stretched by a factor of 4.17 and the gross count is obtained by summing the channels above the fixed threshold. The same channels will be summed. In yet another embodiment, gross count is obtained by summing the nominal channels and the hardware gain is increased by a factor of 4.17. In this embodiment, being off by a factor of four would normally only occur when the tool is first turned on. The next spectrum obtained at the larger gain would be much closer to the nominal spectrum, and the subsequent gain adjustment from that spectrum would put the gain very close to the desired value.

As another example, consider a third data set that has a derivative curve with a location of a maximum value of about 200. So, the spectrum adjustment factor could be determined with the algebraic expression 200x=50 and so the spectrum adjustment factor is 0.25. The factor 0.25 would be applied to the gain before taking the count for the channels of the n channels above the threshold.

Referring generally to the figures, a system 116, 216, 316 for measuring natural gamma rays in a wellbore 126, 226 is presented that includes a downhole gamma ray detector 118, 218, 318 that provides signals that scale with energy deposited by gamma rays in the downhole gamma ray detector 118, 218, 318. As shown best in FIG. 3, the signals developed by the downhole gamma ray detector 118, 218, 318 are delivered to an electronics unit 337. The electronics unit 337 is electrically coupled to the downhole gamma ray detector 318 for converting the signals into digital signals. The digital signals, or data set, are delivered to a processing unit 324. The processing unit 324 is electrically coupled to the electronics unit 337. The processing unit 324 includes one or more downhole memories 340 for storing data or instructions and one or more downhole processors 342 associated with the one or more memories.

The electronics unit 337 and processing unit 342 are operable, inter alia, to sort the digital signals from the downhole gamma ray detector 118, 218, 318 into channels according to amplitude of the digital signals and store as an energy spectrum. The gross count may be taken, but the threshold or gain may be adjusted first in some embodiments. As previously noted, this may be done by manipulating the digital signals in the channels or by manipulating the hardware (e.g., detector 118, 218, 318 or electronics unit 337), or both. The one or more processors 342 in association with the one or more memories 340 may be configured to take a derivative of the digital signals stored in the channels, locate a maximum value of the derivative of the digital signals, and sum counts of the digital signals in the channels above a threshold.

In one illustrative embodiment, the threshold is predetermined and the one or more processors 342 in association with the one or more memories 340 is configured to sum counts of the digital signals in the channels above the threshold based on the location of the maximum value of the derivative of the digital signals by determining a gain adjustment factor such that maximum value of the digital signals stored in the channels is substantially equal to a reference maximum and adjusting the gain of the digital signals stored in the channels by the gain adjustment factor. The counts above the threshold after applying the gain adjustment factor are then summed.

In one illustrative embodiment, the one or more processors 342 in association with the one or more memories 340 is configured to sum counts of the digital signals in the channels above a threshold based on the location of the maximum value of the derivative of the digital signals by adjusting a gain of the downhole gamma ray detector 118, 218, 318 so as to move the location of the maximum value of the derivative of the digital signals on subsequent signals closer to a predetermined location. The counts above the threshold, that is above the fixed threshold channel, are summed. The sum may have an error associated with the sum if the required gain adjustment is large. In other words, to get the correct count, more adjustment may be needed but each iterative cycle should decrease the error because the adjustment will typically make the threshold more likely to be in the proper location.

In one illustrative embodiment, the one or more processors 342 in association with the one or more memories 340 is configured to sum counts of the digital signals in the channels above a threshold based on the location of the maximum value of the derivative of the digital signals by adjusting the variable high voltage power supply 339 so as to move the location of the maximum value of the derivative of the digital signals closer to a predetermined location. The counts above the fixed threshold are summed. Again, the sum may have an error associated with the sum if the gain adjustment is large, but sums from subsequent spectra should have smaller errors.

In one illustrative embodiment, the one or more processors 342 in association with the one or more memories 340 is configured to sum counts of the digital signals in the channels above a threshold. The threshold is set relative to the location of the maximum of the derivative. For example, the threshold might be set at some fraction, e.g., ¼, ½, ¾, 0.9, etc., of the channel number at which the derivative is maximum.

Figure 9:
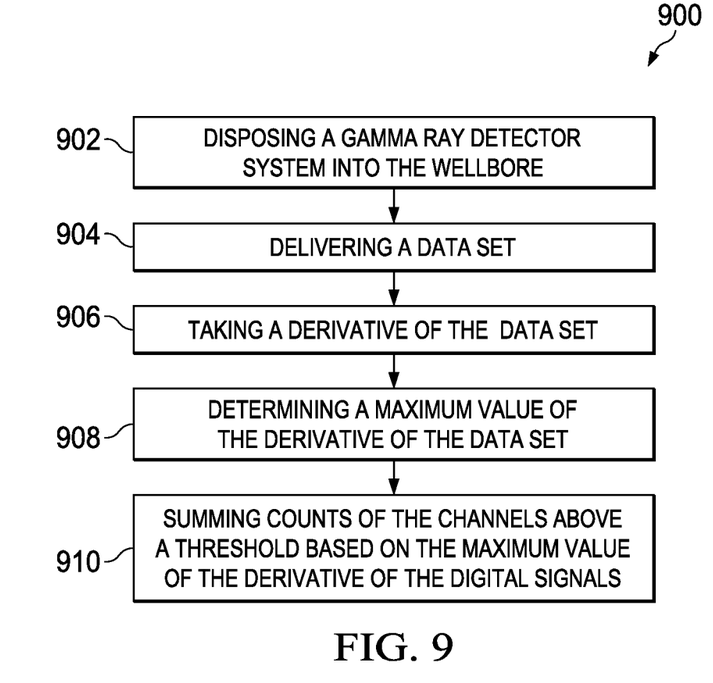
FIG. 9 is a schematic flow chart showing steps in an illustrative method for detecting gamma radiation in a wellbore.

Referring now primarily to FIG. 9, an illustrative embodiment of a method 900 for detecting gamma radiation in a wellbore is presented. The method includes disposing a gamma ray detector system into the wellbore at 902. The gamma ray detector includes a processing unit that includes one or more downhole memories for storing data or instructions and one or more processors associated with the one or more downhole memories. The method further includes delivering a data set to the one or more processors and one or more memories at 904. The data set includes a count rate for each of n channels.

The processing unit is used to take a derivative of the data set at step 906. Then the location of the maximum value of the derivative of the data set is determined at 908. At 910, the counts of the channels above a threshold based on the location of the maximum value of the derivative of the digital signals are summed. The location of the maximum value of the derivative of the digital signals may be used to calculate a gain adjustment or move the threshold to stabilize the gamma ray detector and arrive at a good natural, gross gamma ray count.

In another embodiment, the process 900 is the same as shown in FIG. 9, but the last process 910 is modified. The location of the derivative is used to provide feedback or an adjustment signal to the electronics unit 337—typically to the amplifier 338 or high voltage unit 339. While this hardware approach to stabilization may involve a larger error initially, the subsequent spectra should have less error because of the feedback and adjustment. Thus, in one illustrative embodiment, the one or more processors in association with the one or more memories is configured to prepare an adjustment signal based on the location of the maximum value of the derivative of the digital signals that is sent to the electronics unit to adjust the high voltage unit or amplifier to move the location of the maximum value of the derivative closer to a predetermined location relative to the location of the maximum of the derivative on subsequent data sets. In one example, an adjustment signal may be developed that modifies the amplifier to adjust a gain of the signals that moves the location of the maximum value of the derivative for subsequent signals closer to the predetermined location. In another example, an adjustment signal that modifies the variable high voltage supply unit is developed so that the location of the maximum value of the derivative for subsequent signals moves closer to a predetermined location.

In one illustrative example, step 910 may be accomplished by determining a gain adjustment factor such that the maximum value of the derivative of the data set stored in the channels is substantially equal to a reference maximum or predetermined location. Then the gain of the data set stored in the channels is adjusted by the gain adjustment factor. Finally, the counts above the threshold are summed after applying the gain adjustment factor.

In one illustrative example, 910 may be accomplished by adjusting a gain of the downhole gamma ray detector so as to move the location of the maximum value of the derivative of the data set closer to a predetermined location. The counts above the threshold are summed after adjusting the gain of the downhole gamma ray detector.

In one illustrative example, 910 may be accomplished by moving the threshold to a location that is a percentage less than one hundred percent of the maximum of the derivative of the data set. The counts above the threshold are summed after moving the threshold.

In addition to the embodiments described above, many examples of specific combinations are within the scope of the disclosure, some of which are detailed below.

Example 1

A system for measuring natural gamma rays in a wellbore, the system including:
 a downhole gamma ray detector that provides signals that scale with energy deposited by gamma rays in the downhole gamma ray detector;
 an electronics unit electrically coupled to the downhole gamma ray detector for converting the signals into digital signals;
 a processing unit electrically coupled to the electronics unit, wherein the processing unit includes one or more downhole memories for storing data or instructions and one or more downhole processors associated with the one or more memories;
 wherein the electronics unit and processing unit are operable to sort the digital signals from the downhole gamma ray detector into channels according to amplitude of the digital signals and storing as an energy spectrum; and
 wherein the one or more processors in association with the one or more memories is configured to:
  take a derivative of the digital signals stored in the channels,
  locate a maximum value of the derivative of the digital signals, and
  sum counts of the digital signals in the channels above a threshold based on the maximum value of the derivative of the digital signals.

Example 2

The system of example 1, wherein the threshold is predetermined and the one or more processors in association with the one or more memories is configured to sum counts of the digital signals in the channels above a threshold based on the maximum value of the derivative of the digital signals by performing steps that comprise:
 determining a gain adjustment factor such that maximum value of the digital signals stored in the channels is substantially equal to a reference maximum;
 adjusting the gain of the digital signals stored in the channels by the gain adjustment factor; and summing counts above the threshold after applying the gain adjustment factor.

Example 3

The system of example 1, wherein the one or more processors in association with the one or more memories is configured to sum counts of the digital signals in the channels above a threshold based on the maximum value of the derivative of the digital signals by performing steps that comprise:
adjusting a gain of the downhole gamma ray detector so as to keep the maximum value of the derivative of the digital signals at a predetermined location; and
summing counts above the threshold after adjusting the gain of the downhole gamma ray detector.

Example 4

The system of example 1,
wherein the electronics unit includes a variable high voltage power supply;
wherein the amplitude of the signals from the gamma ray detector vary with the voltage level of the high voltage power supply; and
wherein the one or more processors in association with the one or more memories is configured to sum counts of the digital signals in the channels above a threshold based on the maximum value of the derivative of the digital signals by performing steps that comprise:
adjusting the variable high voltage power supply so as to keep the maximum value of the derivative of the digital signals at a predetermined location; and
summing counts above the threshold after adjusting the variable high voltage power supply.

Example 5

The system of example 1, wherein the one or more processors in association with the one or more memories is configured to sum counts of the digital signals in the channels above a threshold based on the maximum value of the derivative of the digital signals by performing steps that comprise:
moving the threshold to a location that is a percentage less than one hundred percent of the maximum of the derivative of the digital signals; and
summing counts above the threshold after adjusting moving the threshold.

Example 6

The system of example 1 or any of the preceding examples, wherein the system is associated with a drilling assembly.

Example 7

The system of example 1 or any of examples 1-5, wherein the system is associated with a wireline tool.

Example 8

The system of example 1 or any of the preceding examples, wherein the one or more processors in association with the one or more memories is configured to take a derivative of the digital signals stored in the channels by performing one or more steps that comprise taking half of a difference between adjacent channels storing the digital signals.

Example 9

The system of example 1 or any of the preceding examples, wherein the channels comprise at least 250 channels.

Example 10

The system of example 1 or any of the preceding examples, wherein the downhole gamma ray detector includes at least two azimuthal gamma ray detectors. Other numbers, 3, 4, 5, 6, 7, etc. could be used.

Example 11

A method for detecting natural gamma radiation in a wellbore, the method including:
disposing a gamma ray detector system into the wellbore, wherein the gamma ray detector includes a processing unit that includes one or more downhole memories for storing data or instructions and one or more processors associated with the one or more downhole memories;
delivering a data set to the one or more processors and one or more memories, wherein the data set includes a count rate for each of n channels;
taking a derivative of the data set;
determining a maximum value of the derivative of the data set; and
summing counts of the channels above a threshold based on the maximum value of the derivative of the digital signals.

Example 12

The method of example 11, wherein the step of summing counts of the channels above a threshold based on the maximum value of the derivative of the digital signals includes:
determining a gain adjustment factor such that maximum value of the derivative of the data set stored in the channels is substantially equal to a reference maximum;
adjusting the gain of the data set stored in the channels by the gain adjustment factor; and
summing counts above the threshold after applying the gain adjustment factor.

Example 13

The method of example 11, wherein the step of summing counts of the channels above a threshold based on the maximum value of the derivative of the digital signals includes:
adjusting a gain of the downhole gamma ray detector so as to keep the maximum value of the derivative of the data set at a predetermined location; and
summing counts above the threshold after adjusting the gain of the downhole gamma ray detector.

Example 14

The method of example 11, wherein the step of summing counts of the channels above a threshold based on the maximum value of the derivative of the digital signals includes:
moving the threshold to a location that is a percentage less than one hundred percent of the maximum of the derivative of the data set; and summing counts above the threshold after moving the threshold.

Example 15

The method of example 11 or any of examples 12-14, wherein n is greater than 250.

Example 16

The method of example 11 or any of examples 12-15, wherein the gamma ray detector system includes a borehole assembly.

Example 17

The method of example 11 or any of examples 12-15, wherein the gamma ray detector system includes a wireline tool.

Example 18

The method of example 11 or any of examples 12-17, further including determining a total count of the n channels greater than the threshold and transmitting the total count.

Example 19

A system for measuring natural gamma rays in a wellbore, the system including:
  a downhole gamma ray detector that provides signals that scale with energy deposited by gamma rays in the downhole gamma ray detector;
  an electronics unit electrically coupled to the downhole gamma ray detector for converting the signals into digital signals, wherein the electronics unit includes a variable high voltage power supply, an amplifier, and an analog-to-digital converter;
  a processing unit electrically coupled to the electronics unit, wherein the processing unit includes one or more downhole memories for storing data or instructions and one or more downhole processors associated with the one or more memories;
  wherein the electronics unit and processing unit are operable to sort the digital signals from the downhole gamma ray detector into channels according to amplitude of the digital signals and storing as an energy spectrum;
  wherein the one or more processors in association with the one or more memories is configured to:
    take a derivative of the digital signals stored in the channels,
    locate a maximum value of the derivative of the digital signals,
    adjust the gain or threshold based on the location of the maximum value of the derivative of the digital signals, and
    sum counts of the digital signals in the channels above a threshold based on the maximum value of the derivative of the digital signals after adjusting the gain or threshold.

Example 20

The system of example 19, wherein:
  wherein the threshold is predetermined and the one or more processors in association with the one or more memories is configured to sum counts of the digital signals in the channels above a threshold based on the maximum value of the derivative of the digital signals by performing steps that comprise:
    determining a gain adjustment factor such that maximum value of the derivative of the digital signals stored in the channels is substantially equal to a reference maximum;
    adjusting the gain of the digital signals stored in the channels by the gain adjustment factor; and
    summing counts above the threshold after applying the gain adjustment factor;
  the channels comprise more than 250 channels; and
  wherein the downhole gamma ray detector includes at least three azimuthal gamma ray detectors.

Example 21

A system for measuring natural gamma rays in a wellbore, the system including:
  a downhole gamma ray detector that provides signals that scale with the energy deposited by gamma rays in the detector;
  memory for storing data or instructions;
  a means for sorting the signals from gamma rays into channels according to signal amplitude and storing the count rates in memory as an energy spectrum;
  a means of determining the location of the maximum value of the derivative of the data set with respect to channel number; and
  a means for obtaining the counts whose amplitude was above a specified energy threshold based upon the location of the maximum value of the derivative.

Example 22

The system of example 21, wherein the system includes a means for adjusting the gain of the signals from the detector so as to keep the location of the maximum of the derivative in a predetermine location and the counts are computed as a sum of predetermined channels.

Example 23

The system of example 22, wherein:
  the gamma ray detector is powered by a variable high voltage power supply;
  the amplitude of signals from the detector vary with the voltage level of the high-voltage power supply;
  the level of the high voltage is adjusted to keep the location of the maximum of the derivative in a predetermine location; and
  the counts are computed as a sum of predetermined channels.

Example 24

The system of example 22, wherein:
  amplitudes of the gamma ray signals are amplified by a variable gain amplifier;
  the gain level of the amplifier is adjusted to keep the location of the first derivative in a predetermine location; and
  the counts are computed as a sum of predetermined channels.

Example 25

The system of example 21, wherein the channels used in obtaining the counts are determined by the location of the maximum of the derivative.

Example 26

The system of example 21, wherein determining the derivative of a channel includes subtracting the sum of one or more lower-energy channels from the sum of one or more higher-energy channels.

Example 27

The system of example 21, wherein the threshold is chosen to be above the maximum anticipated noise level of the system and below the bulk of the signals originating with gamma rays from the formation.

Example 28

The system of example 21 or any of examples 22-27, wherein the system is associated with a drilling assembly.

Example 29

The system of example 21 or any of examples 22-27, wherein the system is associated with a wireline tool.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order, or simultaneously where appropriate.

Where appropriate, aspects of any of the examples described above may be combined with aspects of any of the other examples described to form further examples having comparable or different properties and addressing the same or different problems.

It will be understood that the above description of preferred embodiments is given by way of example only and that various modifications may be made by those skilled in the art. Although various embodiments of the invention have been described above with a certain degree of particularity, or with reference to one or more individual embodiments, those skilled in the art could make numerous alterations to the disclosed embodiments without departing from the scope of the claims.

I claim:

1. A system for measuring natural gamma rays in a wellbore, the system comprising:
    a downhole gamma ray detector that provides signals that scale with energy deposited by gamma rays in the downhole gamma ray detector;
    an electronics unit electrically coupled to the downhole gamma ray detector for converting the signals including preparing digital signals;
    a processing unit electrically coupled to the electronics unit, wherein the processing unit comprises one or more memories for storing data or instructions and one or more processors associated with the one or more memories;
    wherein the electronics unit and processing unit are operable to sort the digital signals from the downhole gamma ray detector into channels according to amplitude of the digital signals and storing the sorted digital signals as an energy spectrum; and
    wherein the one or more processors in association with the one or more memories is configured to:
        take a derivative of the digital signals stored in the channels, locate a maximum value of the derivative of the digital signals, and sum counts of the digital signals in the channels above a threshold based on the location of the maximum value of the derivative of the digital signals.

2. The system of claim 1, wherein the threshold is predetermined and the one or more processors in association with the one or more memories is configured to sum counts of the digital signals in the channels above the threshold based on the location of the maximum value of the derivative of the digital signals by performing steps that comprise: determining a gain adjustment factor such that the maximum value of the derivative of the digital signals stored in the channels is substantially equal to a reference maximum; adjusting the gain of the digital signals stored in the channels by the gain adjustment factor; and summing counts above the threshold after applying the gain adjustment factor.

3. The system of claim 1, wherein the one or more processors in association with the one or more memories is configured to sum counts of the digital signals in the channels above a threshold based on the location of the maximum value of the derivative of the digital signals by performing steps that comprise: moving the threshold to a location that is a fraction of the location of the maximum of the derivative of the digital signals; and summing counts above the threshold after moving the threshold.

4. The system of claim 1, wherein the system is associated with a drilling assembly.

5. The system of claim 1, wherein the system is associated with a wireline tool.

6. The system of claim 1, wherein the one or more processors in association with the one or more memories is configured to take a derivative of the digital signals stored in the channels by performing one or more steps that comprise taking a difference between adjacent channels storing the digital signals.

7. The system of claim 1, wherein the channels comprise at least 250 channels.

8. The system of claim 1, wherein the downhole gamma ray detector comprises at least two azimuthal gamma ray detectors.

9. A system for measuring natural gamma rays in a wellbore, the system comprising:
    a downhole gamma ray detector that provides signals that scale with energy deposited by gamma rays in the downhole gamma ray detector;
    an electronics unit electrically coupled to the downhole gamma ray detector for converting and processing the signals including preparing digital signals;
    a processing unit electrically coupled to the electronics unit, wherein the processing unit comprises one or more memories for storing data or instructions and one or more processors associated with the one or more memories;

wherein the electronics unit comprises a variable high voltage supply unit coupled to the downhole gamma ray detector and the processing unit, and an amplifier coupled to the downhole gamma ray detector and the processing unit;

wherein the electronics unit and processing unit are operable to sort the digital signals from the downhole gamma ray detector into channels according to amplitude of the digital signals and store the sorted digital signals as an energy spectrum; and wherein the one or more processors in association with the one or more memories is configured to:
  take a derivative of the digital signals stored in the channels, locate a maximum value of the derivative of the digital signals, sum counts of the digital signals in the channels above a threshold, and
  prepare an adjustment signal based on the location of the maximum value of the derivative of the digital signals and send the adjustment signal to the electronics unit to adjust the high voltage unit or amplifier to move the location of the maximum value of the derivative closer to a predetermined location for subsequent signals.

10. The system of claim 9, wherein the one or more processors in association with the one or more memories is configured to prepare the adjustment signal that is sent to the electronics unit by performing one or more steps that comprise:
  developing an adjustment signal that modifies the amplifier to adjust a gain of the signals so as to move the location of the maximum value of the derivative for subsequent signals closer to the predetermined location.

11. The system of claim 9, wherein the one or more processors in association with the one or more memories is configured to prepare the adjustment signal that is sent to the electronics unit by performing one or more steps that comprise:
  developing an adjustment signal that modifies the variable high voltage supply unit so that the location of the maximum value of the derivative for subsequent signals moves closer to the predetermined location.

12. The system of claim 9, wherein the one or more processors in association with the one or more memories is configured to take a derivative of the digital signals stored in the channels by performing one or more steps that comprise taking a difference between adjacent channels storing the digital signals.

13. A method for detecting natural gamma radiation in a wellbore, the method comprising:
  disposing a gamma ray detector system comprising a gamma ray detector into a wellbore, wherein the gamma ray detector comprises a processing unit that includes one or more memories for storing data or instructions and one or more processors associated with the one or more memories;
  delivering a data set to the one or more processors and the one or more
  memories, wherein the data set includes a count rate for each of n channels distributed to form an energy spectrum;
  taking a derivative of the data set;
  determining a location of a maximum value of the derivative of the data set; adjusting a threshold or gain based on the location of the maximum value of the derivative; and
  summing counts of the channels above the threshold.

14. The method of claim 13, wherein the steps of adjusting a threshold or gain based on the location of the maximum value of the derivative and summing counts of the channels above the threshold comprise:
  determining a gain adjustment factor such that the location of the maximum value of the derivative of the data set stored in the channels is substantially equal to a location of a reference maximum;
  adjusting the gain of the data set stored in the channels by the gain adjustment factor; and
  summing counts above the threshold after applying the gain adjustment factor.

15. The method of claim 13, wherein the gamma ray detector system comprises an amplifier coupled to the gamma ray detector, and wherein the steps of adjusting a threshold or gain based on the location of the maximum value of the derivative and summing counts of the channels above the threshold comprise:
  adjusting the amplifier so as to move the location of the maximum value of the derivative of a subsequent data set closer to a predetermined location; and
  summing counts above the threshold.

16. The method of claim 13, wherein the steps of adjusting a threshold or gain based on the location of the maximum value of the derivative and summing counts of the channels above the threshold comprise:
  moving the threshold to a location that is a fraction of the location of the maximum of the derivative of the data set; and
  summing counts above the threshold after moving the threshold.

17. The method of claim 13, wherein n is greater than 250.

18. The method of claim 13, wherein the gamma ray detector system comprises a drilling assembly.

19. The method of claim 13, wherein the gamma ray detector system comprises a wireline tool.

20. The method of claim 13, further comprising determining a total count of the n channels greater than the threshold and transmitting the total count.

* * * * *